No. 676,249. Patented June 11, 1901.
J. P. B. FISKE.
APPARATUS FOR THE MANUFACTURE OF BRICKS.
(Application filed Nov. 27, 1899.)

(No Model.) 3 Sheets—Sheet 1.

Witnesses.
Thomas J. Drummond
George L. Dolbeare

Inventor.
Jonathan P. B. Fiske,
by Crosby & Gregory attys.

No. 676,249. Patented June 11, 1901.
J. P. B. FISKE.
APPARATUS FOR THE MANUFACTURE OF BRICKS.
(Application filed Nov. 27, 1899.)

(No Model.) 3 Sheets—Sheet 2.

Witnesses.
Thomas J. Drummond
George L. Dolbeare

Inventor.
Jonathan P. B. Fiske,
by Crosby & Gregory
Attys

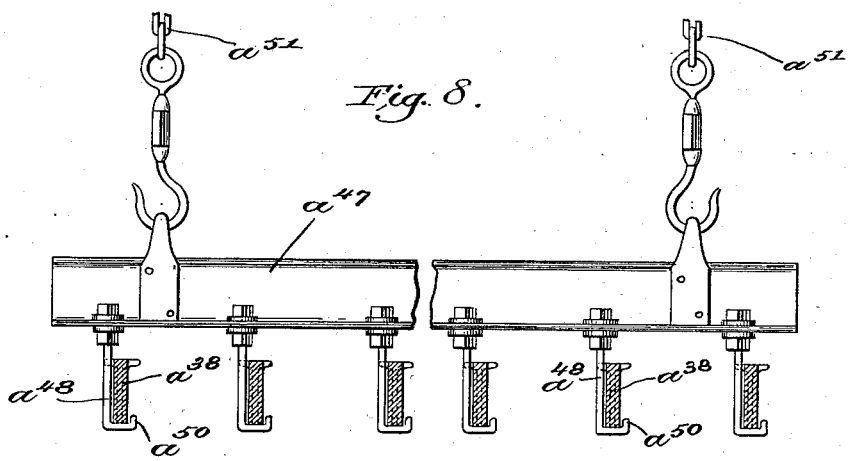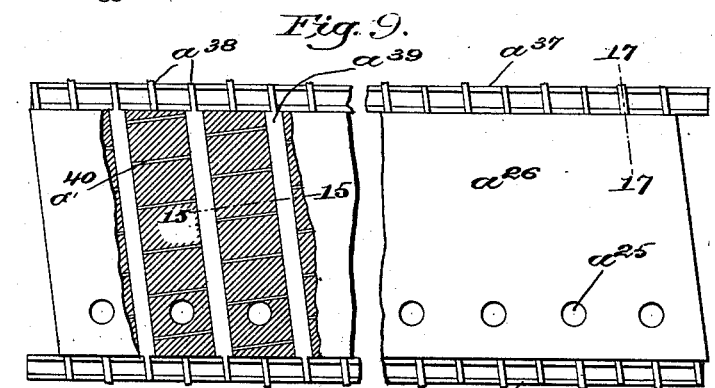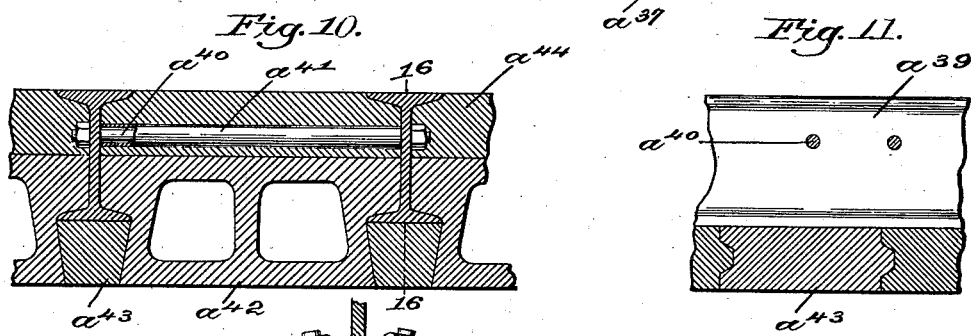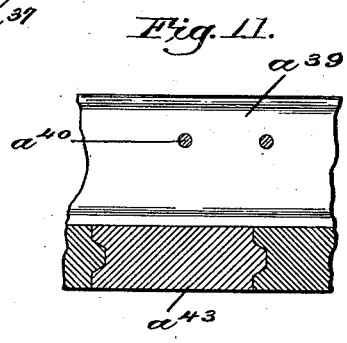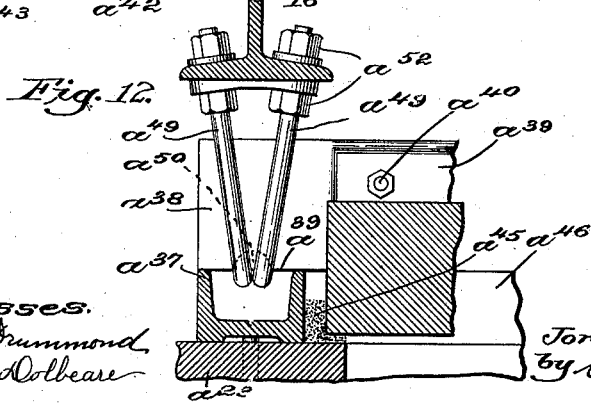

UNITED STATES PATENT OFFICE.

JONATHAN P. B. FISKE, OF NEWTON, MASSACHUSETTS.

APPARATUS FOR THE MANUFACTURE OF BRICKS.

SPECIFICATION forming part of Letters Patent No. 676,249, dated June 11, 1901.

Application filed November 27, 1899. Serial No. 738,351. (No model.)

*To all whom it may concern:*

Be it known that I, JONATHAN P. B. FISKE, a citizen of the United States, residing at Newton, county of Middlesex, State of Massachusetts, have invented an Improvement in Apparatus for the Manufacture of Bricks, of which the following description, in connection with the accompanying drawings, is a specification, like letters on the drawings representing like parts.

My invention is an improvement in apparatus for the manufacture of bricks.

My invention is embodied in a plant of the continuous-kiln variety and includes a special heating system or means for circulating fire and hot air whereby the bricks are first properly and quickly dried in relatively small and isolated quantities and are then quickly and evenly burned. As herein shown, I provide a continuous kiln having a plurality of chambers arranged in line with each other and provided with means for admitting fuel thereto, and with overhead smoke-flues for the heat communication with a central stack, so that the fire from the burning-chamber is compelled to rise on one side through the bricks, descend on the other side therethrough, pass under the separating-wall to the next chamber, where it repeats the same movement, and thence through the next chamber, and so on until it reaches the outlet-flue, whence it is conveyed through the top of that chamber to the exhaust-flue leading to the stack, and meanwhile those chambers which have been burned and are cooling off are provided at the rear end of the series with an outlet-flue communicating with a hot-air flue preferably on the side of the kiln opposite the smoke-flue, said hot-air flue leading to the driers, and the hot air having passed longitudinally through such of the driers as desired is then carried out of the stack.

The constructional details of my invention will be more fully pointed out in the following description, reference being had to the accompanying drawings, illustrative of one embodiment of my invention, and the latter will be more particularly defined in the appended claims.

Figure 1:
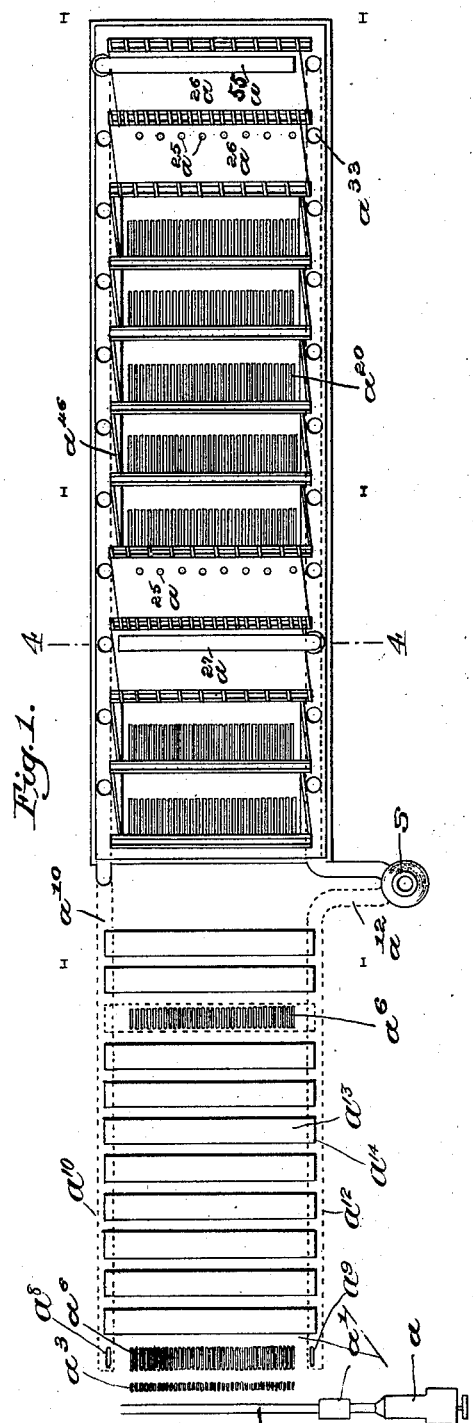
Figure 2:
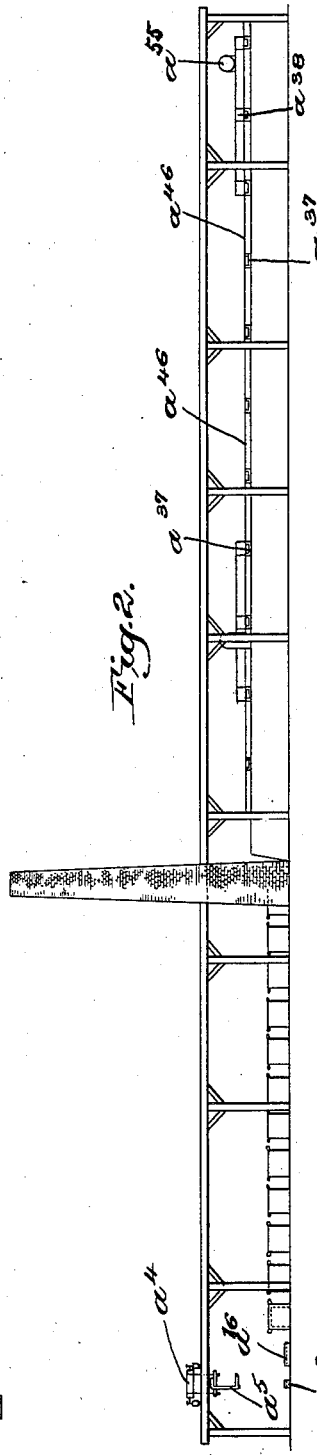
Figure 3:
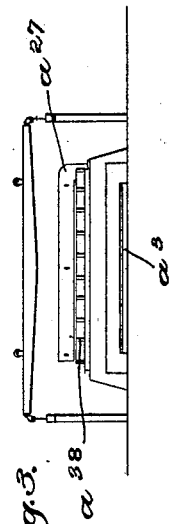
Figure 4:
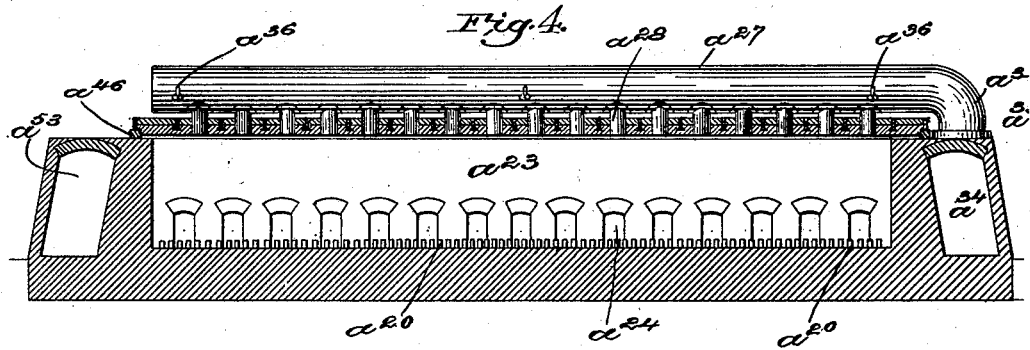
Figure 5:
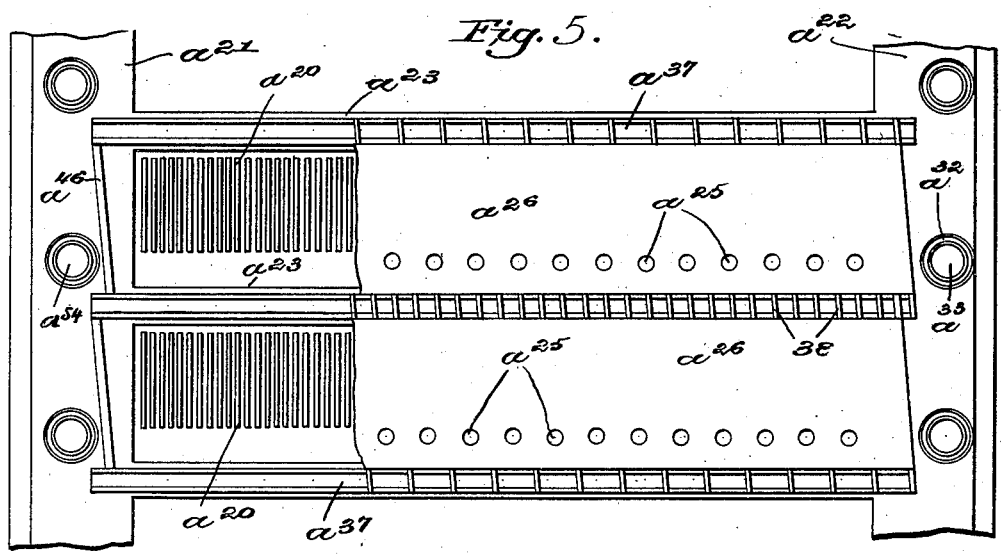
Figure 6:
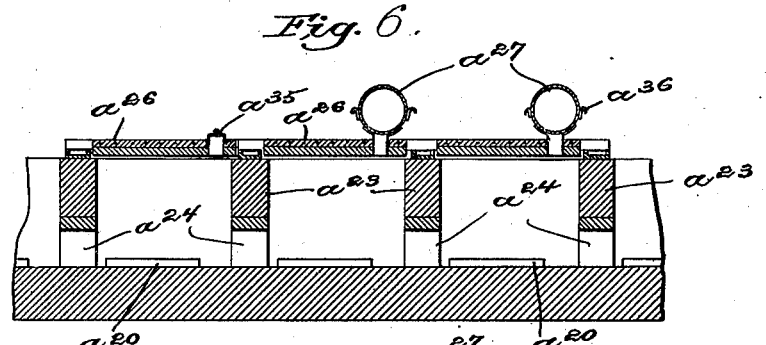
Figure 7:
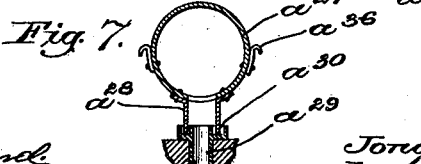

In the drawings, Figure 1 is a top plan view showing a plant embodying my invention. Fig. 2 shows the same in side elevation. Fig. 3 is an end elevation thereof. Fig. 4 is a vertical longitudinal section on the line 4 4, Fig. 1. Fig. 5 is a top plan view showing two of the burning-chambers with the covers broken away. Fig. 6 is a longitudinal vertical section of a portion of the kiln. Fig. 7 is a cross-sectional detail of one of the removable flues. Fig. 8 shows a portion of the cover-lifting device, the beams of the cover or top of the kiln being shown in cross-section. Fig. 9 is a top plan view of one of the covers, said figure indicating also the relative positions of the adjacent covers. Fig. 10 is an enlarged sectional view on the line 15 15, Fig. 14. Fig. 11 is a sectional view on the line 11 11, Fig. 10. Fig. 12 is a cross-sectional view on the line 12 12, Fig. 9, parts being omitted, showing the lifter in position.

Referring now more particularly to Figs. 1 to 3, it will be seen that the plant includes in general a brick-making machine $a$, of any approved or preferred kind, a cutter $a'$ for cutting the bricks, and a separating-belt $a^2$, from which, it will be understood by those skilled in the art, the bricks are taken by hand or other means and placed on a setting-up stand $a^3$, whence they are carried, preferably, by an overhead crane $a^4$ and lifting means $a^5$ (the latter not being herein described or shown in detail, as it constitutes the subject-matter of another application) and deposited on receiving-beds $a^6$ of driers. At the opposite ends of the drier I provide openings $a^8$ $a^9$, communicating with passages $a^{10}$ $a^{12}$, herein shown as under ground and extending transversely of the driers, the former of these passages $a^{10}$ constituting a hot-air-supply passage and the latter passage $a^{12}$ leading from the drier to the stack $s$. Coöperating with the openings $a^8$ $a^9$ are removable covers $a^{13}$, provided with suitable means for lifting them off, herein shown in the form of hooks $a^{14}$, that would receive lifting devices from the overhead crane. When the rack or receiving-bed of a drier has been filled with its complement of green bricks, the cover is put in place and the hot air arises from the passage $a^{10}$ through the opening $a^8$ and is forced rapidly through the drier, lengthwise thereof, and out through the opening $a^9$ and the passage $a^{12}$ to the stack, this constant circulation in a confined area serving to rapidly and uniformly dry the bricks. When the cover is not in place, the openings $a^8$ $a^9$ are maintained closed. I regard this drier feature of my invention as entirely novel and of much value, inasmuch as it does away with the building of any walls or superficial structure and requires only a minimum outlay for the plant, inasmuch as the covers may be used interchangeably for any of the driers, and may thereby be kept in continuous use, being simply removed from a dried stack of bricks and placed over a fresh supply of green bricks stacked on another rack while the previous stack was being dried. This construction is exceedingly cheap, and when the immense outlay required for a large brick plant is considered this feature becomes of vital importance, inasmuch as the extreme cost of most of the plants heretofore suggested have been prohibitive of their adoption. Moreover, this invention coöperates admirably with the handling of bricks by an overhead crane, and inasmuch as the latter is the only means at present known to me for handling bricks in great quantities with extreme rapidity and facility it becomes of great importance to provide a drier which shall not interfere with the overhead handling of bricks, but shall instead thereof make the latter more feasible, economical, and convenient.

Referring now to Figs. 4 to 12, in which the details of my improved kiln are shown, it will be seen that each kiln-chamber is provided with a series of cleats $a^{20}$, arranged substantially the same as the cleats already explained in connection with the driers, and the kiln itself is constructed with longitudinal walls $a^{21}$ $a^{22}$ and transverse walls or partitions $a^{23}$, all as found in general in continuous kilns, the partition-walls having openings or fire-passages $a^{24}$ along their lower portions. (See Figs. 4 and 6.) Each chamber is provided with fuel-supply holes $a^{25}$ through its top $a^{26}$.

As thus far described the kiln does not differ materially from those heretofore employed in the most advanced plants. Instead, however, of depending for the fire circulation and draft upon a fire-outlet at the lower corners of the chambers leading to a cold and usually damp underground main flue connecting with the stack, as heretofore employed, which not only has resulted in drawing the heat to the corners of the chambers, leaving the center improperly burned, but has proved still more seriously inefficient because of the invariably poor draft resulting from coldness and generally the dampness of the main flue so located, I employ a plurality of overhead exits distributed across the width of the kiln at frequent intervals connecting with a main flue provided in the heated wall of the kiln itself, said heated wall not only being entirely out of the influence of the cold earth and dampness, but being necessarily hot, and therefore on this account accelerating the draft.

The distribution of the heat by reason of the numerous exits in connection with the partition-walls results in a uniform and rapid burning of the bricks in all parts of the chamber, the heat being compelled to pass downwardly from one chamber to the next, and then rising by its natural law and passing over horizontally through the kiln to the opposite side, and downwardly under the next partition, and finally out through the outlet-pipe, as clearly shown in Fig. 6.

The removable flue or outlet-pipe is shown at $a^{27}$, where it will be observed that it is provided with depending branches $a^{28}$, located at intervals corresponding to the fuel-openings $a^{25}$, and the latter (see Fig. 7) contain thimbles or linings $a^{29}$, having annular openings $a^{30}$ to receive the lower ends of said branches $a^{28}$, and the outer end $a^{31}$ of the pipe $a^{27}$ fits similarly into an annular groove $a^{32}$ of the opening $a^{33}$, leading to the main passage or smoke-flue $a^{34}$. All these openings are closed when not in use by removable caps $a^{35}$, and the pipe $a^{27}$ has hooks or other means $a^{36}$ for its ready removal by means of the overhead crane. I do not herein make any claim to any of these details of construction of the kiln taken separately, inasmuch as I have preferred to make use of the materials at hand, my invention not residing in these *per se*, but rather in the novel arrangement and combination thereof, whereby uniform and rapid burning is secured, as already fully explained.

In order to have the main passages or smoke-flues $a^{34}$ in the wall of the kiln, I make the kiln-cover $a^{26}$ removable for the insertion of the charge of bricks, said cover being shown in detail in Figs. 8 to 12.

Along the tops of the partition-walls $a^{23}$ I secure a U-beam or channel-iron $a^{37}$, (see Fig. 12,) on which rest the projecting ends $a^{38}$ of transverse I-beams $a^{39}$ when the cover is in position, said I-beams being secured together by any suitable means, preferably by bolts $a^{40}$ and spacing-sleeves $a^{41}$, Fig. 10, and retaining by their lower flanges fire-clay blocks $a^{42}$, the under sides of the I-beams being protected from the fire by soffit-blocks $a^{43}$, Figs. 10 and 11, and there preferably being a layer of cinder concrete $a^{44}$ on top of the fire-clay blocks and between the I-beams, as clearly shown in Fig. 10. The clay blocks hang down below the I-beams, as is clearly shown in Fig. 12, and the channel-irons $a^{37}$ constitute a wall parallel to the side of the cover for receiving a small amount of sand $a^{45}$, which seals the cover against the possible loss of heat at the joint between the edges thereof and the top of the kiln, while at the ends of the kiln-chamber a flange or raised portion $a^{46}$ is built up for the end I-beams to rest upon.

In order that the kiln-covers may be expeditiously removed by an overhead crane without varying the adjustment of the crane, I arrange the I-beams obliquely to the kiln-chamber, as clearly shown in Fig. 9, so that the opposite ends of a particular I-beam are out of alinement with the length of the kiln, thereby enabling successive covers to have the projecting ends of their I-beams in identical arrangement on the partition-walls, the adjacent ends of the I-beams of successive covers alternating in position along the common supporting-wall therefor. The lifting means for these covers is shown in Fig. 8 and consists of two beams $a^{47}$, (one only being shown in the drawings, as both are identical,) and from the lower flanges of each beam $a^{47}$ depend hooks $a^{48}$, said hooks preferably comprising two parts or stems $a^{49}$, as shown in Fig. 12, having their lower hooked ends welded together to constitute a single hook $a^{50}$ for engaging the lower side of the beams $a^{39}$. Each beam $a^{47}$ is provided with a hook for each projecting end of one side of the removable cover of a kiln-chamber, said hooks being spaced apart to correspond to the spacing of the I-beams, and the two beams $a^{47}$ of the lifter are carried in any suitable manner, as by chains $a^{51}$, depending from the overhead crane, it being understood that the hooks $a^{48}$ are spaced apart and disposed along the two lifting-beams $a^{47}$ to correspond exactly with the arrangement of the I-beams of the cover, as already explained, so that as the chains $a^{51}$ of the two beams $a^{47}$ are lowered they come into correct position for engaging all the projecting ends of the cover simultaneously, and thereby lifting the cover steadily and accurately without any possibility of distortion or twisting.

It is apparent that in a cover built up as mine is it would be disastrous to have any twisting or unevenness of the lifting thereof, and yet it is exceedingly difficult to make all the hooks $a^{48}$ of precisely the same length, and therefore I have not only made them bifurcated or provided with the two parts $a^{49}$, so that they will tend to maintain the beams $a^{47}$ exactly upright and will themselves have no tendency to sway or bend, but I have also made their parts or stems $a^{49}$ accurately adjustable by means of nuts $a^{52}$, so that all the hooks may be adjusted with the greatest accuracy. In order that the hooks $a^{48}$ may readily enter between the beams $a^{39}$, I make these of special construction, forming the metal thereof at the ends without flanges, but thicker than the webs of the intermediate parts of the beams, as shown in Figs. 8 and 12.

At the side of the kiln opposite the smoke-flue $a^{34}$ I provide a hot-air passage or flue $a^{53}$, having openings $a^{54}$ in its upper side similar to the openings $a^{33}$ in the passage $a^{34}$ and adapted to receive a hot-air pipe $a^{55}$, similar in construction to the pipe $a^{27}$, already explained, and coöperating with the passage $a^{53}$ in precisely the same manner as the pipe $a^{27}$ coöperates with the passage $a^{34}$, this passage $a^{53}$ communicating with the passage $a^{10}$ of the drier.

In use the bricks, having been formed by the brick-machine $a$ and cutter $a'$, distributed by the separating-belt $a^2$, and placed by boys or otherwise in properly-stacked position on the setting-up stand $a^3$, are then taken by the lifter $a^5$ and deposited in suitable stack formation on the racks $a^6$, whereupon the caps $a^{16}$ are removed from the openings $a^8$ $a^9$ and a cover $a^{13}$ is brought by the crane and put in position over the stack of green bricks. Thereupon the heat from, let us suppose, the last chamber at the right, Fig. 1, (which is shown as cooling,) ascends through the openings $a^{25}$ of the cover into the pipe $a^{55}$ and thence down through the hot-air flue or passage $a^{53}$ into the passage $a^{10}$ of the drier and up through the opening $a^8$, circulating throughout the length of the confined space within the cover $a^{13}$, so as uniformly to dry all the green bricks therein, thence down through the passage $a^9$ and out through the passage $a^{12}$ to the stack $s$. The green bricks, having been properly dried, are then carried by a crane to one of the empty kiln-chambers, (next to the chamber at the extreme left, Fig. 1, for instance,) and this chamber having been filled with a stack of dried bricks a crane brings up a cover $a^{26}$ and lowers it into position on the channel-irons $a^{37}$, the hooks $a^{48}$ of the cover-lifting device being readily lowered into the grooves of the channel-irons $a^{37}$, so as to be disengaged from the ends of the beams $a^{39}$ of the cover and removed. Then the pipe $a^{27}$ is moved forward from its last position to the chamber next ahead of the one just filled and is put in place over the openings $a^{25}$ of the cover and the opening $a^{33}$ of the smoke-passage $a^{34}$ thereof, so that the bricks in the last-filled chamber are "water-smoked" by the waste heat from the burning-chamber at the rear, said heat being forced through the bricks in the successive chambers in the thorough manner indicated in Fig. 6 and passing out through the smoke-passage to the stack. When these bricks are heated nearly to the burning temperature, coal is poured down through the openings $a^{25}$ in the top of the chamber and the burning completed. Meanwhile the previously-burned chambers, which are in process of cooling off, are connected with the hot-air passage $a^{53}$ for feeding the drier through the passage $a^{10}$ with heated air for drying more green bricks, and thus the process is continued endlessly.

While I have herein shown and described one embodiment of my apparatus and have set forth various advantages thereof, I wish it understood that I am not limited to the details herein set forth, inasmuch as very many changes in arrangement and construction may be resorted to without departing from the spirit and scope of my invention, and I do not, therefore, limit myself otherwise than as hereinafter expressed in the claims.

The firing is done through the openings $a^{25}$, the bottom of the kiln beneath said openings being smooth to give a free and open distribution of the fuel for complete combustion thereof and to facilitate the ready removal of the ashes after the burning.

I do not herein claim the specific construction of the drier and the lifting device, as these will be made the subject-matter of other applications.

It will be observed that in the drawings I have shown the fireproofing of the cover or crown as terminating short of the ends of the I-beams and have claimed the same broadly as arranged and in combination for removal purposes, the said I-beams being free to rest on top of the main wall of the kiln, said construction permitting ready and convenient sealing of the cover, the latter feature, however, being elaborated more fully in a copending application, Serial No. 46,330, wherein the combinations, advantages, and further details of construction are claimed, the same not being herein claimed, because in the present case, so far as relates to the cover, it is my desire to make prominent particularly the removing feature and construction.

Having described my invention, what I claim, and desire to secure by Letters Patent, is—

1. In an apparatus for the manufacture of bricks, a drying-kiln and burning-kiln having a common flue extending longitudinally thereof at one side thereof, openings from said flue into the driers, and other openings from said flue into the chambers of the burning-kiln, and removable means for connecting said flue with said chambers, and removable means for connecting said flue with said drier, substantially as described.

2. In an apparatus for the manufacture of bricks, a drying-kiln and burning-kiln having a common flue extending longitudinally thereof at one side thereof, openings from said flue into the driers, and other openings from said flue into the chambers of the burning-kiln, and removable means for connecting said flue with said chambers, an outlet-flue at the opposite side of said drier, and removable means at said driers for connecting said two flues, substantially as described.

3. In an apparatus for the manufacture of bricks, a burning-kiln having side walls inclosing a plurality of chambers separated by partition-walls, tops for said chambers, a smoke-flue built in one of said walls, fire-passages in the bottom of said partition-walls, a plurality of openings through the tops of said chambers, openings in the top of said smoke-flue corresponding to said openings in the tops of said chambers, and a removable pipe having branch openings communicating with said top openings of a chamber, and with an opening of said smoke-flue, and independent covers for closing the openings when not in use, substantially as described.

4. In an apparatus for the manufacture of bricks, a burning-kiln having side walls inclosing a plurality of chambers separated by partition-walls, tops for said chambers, a smoke-flue built in one of said walls, fire-passages in the bottom of said partition-walls, a plurality of openings through the tops of said chambers, openings in the top of said smoke-flue corresponding to said openings in the tops of said chambers, and a removable pipe having branch openings communicating with said top openings of a chamber and with an opening of said smoke-flue, independent covers for closing the openings when not in use, and means for lifting said pipe, substantially as described.

5. In an apparatus for the manufacture of bricks, a burning-kiln having side walls, a plurality of partition-walls extending between said side walls forming chambers therewith, tops for said chambers, a smoke-flue being formed in one of said side walls, and a hot-air flue being formed in the other of said walls, fire-passages through the lower parts of said partition-walls, openings in the tops of said smoke-flue and hot-air flue and in the tops of said chambers, a removable pipe having openings coöperating with the openings in the tops of said chambers and said smoke-flue, a second removable pipe having openings communicating with the openings in the tops of said chambers and said hot-air flue, and a drier supplied by said hot-air flue, substantially as described.

6. In an apparatus for the manufacture of bricks, a burning-kiln having flues formed in its side walls, combined with a removable top or cover resting on said wall, and containing fuel-supply holes, substantially as described.

7. In an apparatus for the manufacture of bricks, a burning-kiln containing a chamber, supports on the tops of the walls of said chamber for a removable top or cover, two of said supports having upwardly-opening grooves over which said cover may rest, and a cover for said chamber, said cover having a plurality of supporting-beams provided with ends extending beyond the body of the cover to rest over said grooves, substantially as described.

8. In a burning-kiln for bricks, a cover comprising a plurality of supporting-beams secured together, fireproof material supported by said beams and surrounding the lower sides of said beams, said beams having free projecting ends beyond said fireproof material, substantially as described.

9. A kiln or kiln-chamber having at the top of two of its opposite walls a channel member, combined with a removable top or cover adapted to rest upon the top edges of said channel member, whereby a grooved opening is left in said channel member beneath the cover resting thereon, for the reception of devices for removing the cover, substantially as described.

10. A kiln or kiln-chamber, a removable top or cover for said chamber, means at opposite sides of said chamber for supporting said cover, the latter having projecting portions extending freely over said supporting means with a free space beneath said projecting portions and means coöperating with said projecting portions for lifting the cover, substantially as described.

11. The combination with a kiln-chamber, of a removable cover having freely-projecting portions extending at opposite sides with a clear space beneath them when the cover is resting in operative position, and means coöperating with said projecting portions for the removal of the cover, substantially as described.

12. The combination with a kiln or kiln-chamber, of a removable cover composed of a plurality of supporting-beams extending across said cover and having their opposite ends out of alinement with the length of the kiln, said beams being secured together, fireproof material supported thereby, the ends of said beams extending freely beyond the fireproof material, substantially as described.

13. A cover for a kiln or kiln-chamber composed of beams secured together and supporting a body of fireproof material, said beams in their intermediate supporting portions having flanges and at their ends having thickened webs without flanges, substantially as described.

14. A cover for a kiln or kiln-chamber composed of beams secured together and supporting a body of fireproof material, said beams in their intermediate supporting portions having flanges and at their ends having thickened webs without flanges, combined with a lifting device having opposite beams provided with depending hooks spaced apart to correspond with the ends of said beams, substantially as described.

15. A cover for a kiln or kiln-chamber composed of beams secured together and supporting a body of fireproof material, said beams in their intermediate supporting portions having flanges and at their ends having thickened webs without flanges, combined with a lifting device having opposite beams provided with depending hooks spaced apart to correspond with the ends of said beams, and means for accurately adjusting all of said hooks to the same length, substantially as described.

16. In an apparatus for the manufacture of bricks, a burning-kiln having an integrally-removable top or cover resting on the walls of the kiln and having fuel-supply holes in said cover, substantially as described.

17. In an apparatus for the manufacture of bricks, a burning-kiln having a series of cleats extending transversely of the kiln-chamber partially across the same for supporting the bricks to be burned in stack formation thereof, the bottom of the kiln at one side thereof beyond said cleats being smooth to receive fuel for burning the bricks, combined with means for permitting the depositing of fuel directly in the kiln-chamber on said smooth portion of the bottom thereof, substantially as described.

In testimony whereof I have signed my name to this specification in the presence of two subscribing witnesses.

JONATHAN P. B. FISKE.

Witnesses:
   GEO. H. MAXWELL,
   FREDERICK L. EMERY.